Nov. 29, 1949    J. R. DUNN    2,489,869
LOADING PLATFORM
Filed March 1, 1948    2 Sheets-Sheet 1
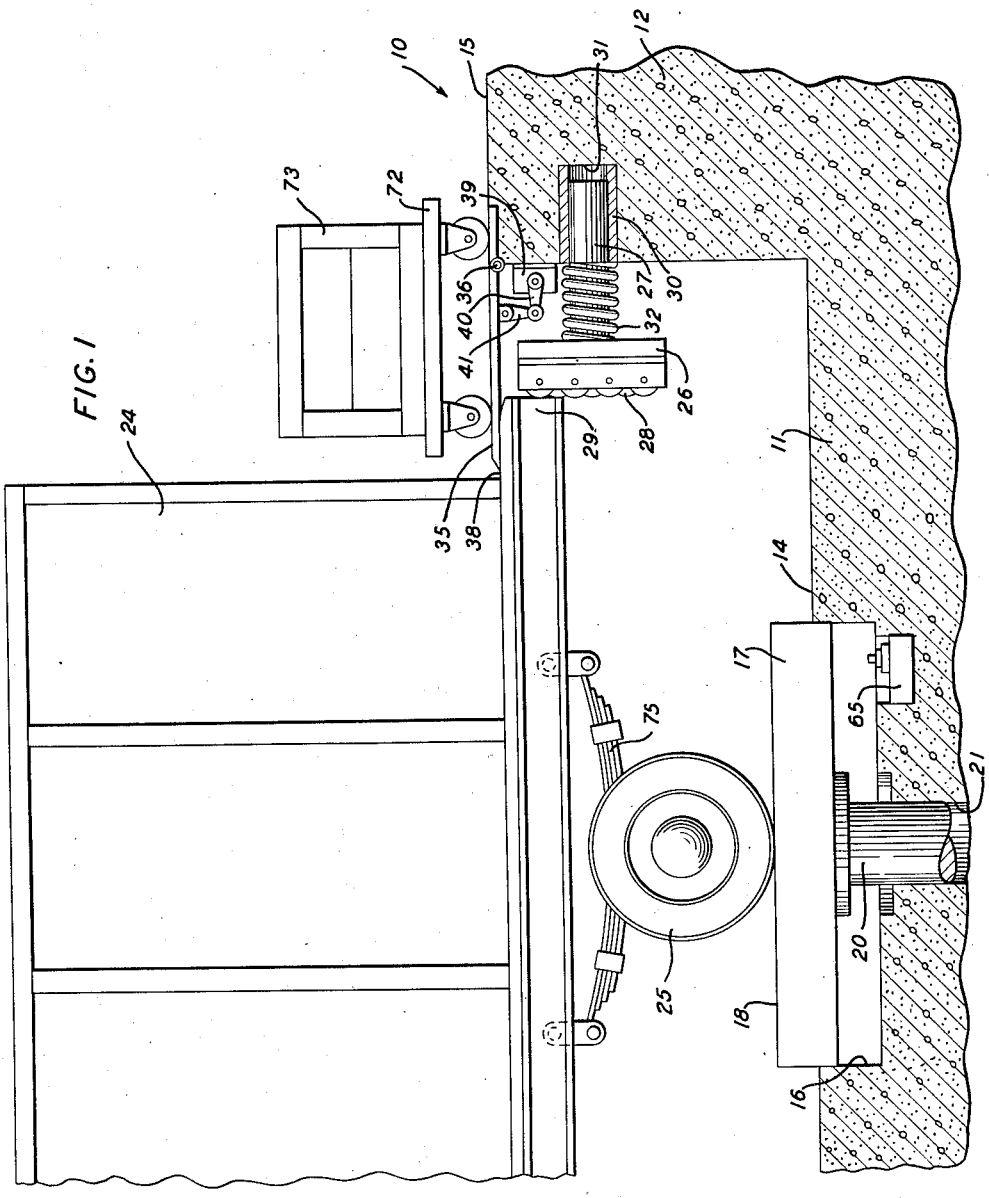
INVENTOR
J. R. DUNN
BY
Iva Parnell
ATTORNEY Nov. 29, 1949  J. R. DUNN  2,489,869
LOADING PLATFORM
Filed March 1, 1948  2 Sheets-Sheet 2

INVENTOR
J. R. DUNN
BY
ATTORNEY

Patented Nov. 29, 1949

2,489,869

UNITED STATES PATENT OFFICE 2,489,869

LOADING PLATFORM

John R. Dunn, South Groveland, Mass., assignor to Western Electric Company, Incorporated, New York, N. Y., a corporation of New York Application March 1, 1948, Serial No. 12,392

10 Claims. (Cl. 214—38)

This invention relates to loading platforms, and more particularly to platforms where trucks or other vehicles are loaded or unloaded.

In the conventional loading platform for trucks, considerable difficulty is encountered, first in the difference in heights of the various trucks, and the change in height of the truck floor during loading and unloading due to the spring action of the vehicle. When a loaded truck is positioned adjacent a conventional loading platform, the floor of the truck may be positioned varied distances below the surface of the platform depending upon the weight of its load. During the process of unloading, the springs of the truck will raise the floor thereof and when the truck is unloaded, the floor may be in a plane with the platform. When the floor of the truck is below the receiving or loading platform the job of unloading the truck is made more difficult and hazardous by the necessity of raising the contents of the truck either manually or by hand truck to the level of the platform. Loading a truck under such conditions is equally difficult and hazardous in that the truck floor may be in a plane with the loading platform when the truck is empty, but during the process of loading the truck, the effect of the added weight on the truck springs will cause the floor of the truck to move downwardly out of alignment with the loading platform.

An object of the invention is to provide a loading platform which is simple in structure and highly efficient in accurately maintaining alignment between the floor of a vehicle and the loading platform either during loading or unloading of the vehicle.

With this and other objects in view, the invention comprises a loading platform having a lower surface to support a vehicle and an upper loading surface including an apron to connect the upper surface with a floor of a vehicle. A lift normally positioned with its upper surface flush with the lower supporting surface is actuable by a control mechanism connected to the apron to maintain the floor of the truck in alignment with the upper surface of the platform.

The control mechanism includes a double switch connected to the apron, the switch being normally open when a floor of the truck is in substantial alignment with the upper surface of the platform, the switch being closed during upward movement of the floor out of alignment with the upper surface of the platform to energize a solenoid-operable valve in a fluid line to lower the lift until the floor is returned to its aligned position with the upper surface of the platform. The switch is also actuable into a closed position by movement of the floor of the vehicle downwardly out of general alignment with the upper surface of the platform to energize a solenoid-operable valve in a fluid line to move the lift upwardly until the floor is again in general alignment with the upper surface of the platform. The control mechanism is initially started by the actuation of an up switch to move the floor of the vehicle into general alignment with the upper surface of the platform. Subsequent to the manual actuation of the up switch, the control mechanism is automatic in maintaining the floor of the vehicle in general alignment with the upper surface of the platform. When it is desirable to remove the truck from the loading platform, a down switch is actuated operating one of the solenoid-operable valves to move the lift downwardly to its initial position at which time a normally closed switch will open the previously closed circuit to lower the lift.

Other objects and advantages will be apparent from the following detailed description when considered in conjunction with the accompanying drawings, wherein Fig. 1 is a fragmentary vertical sectional view of the loading platform with a vehicle raised to position its floor in general alignment with the upper surface of the platform;

Figure 5:
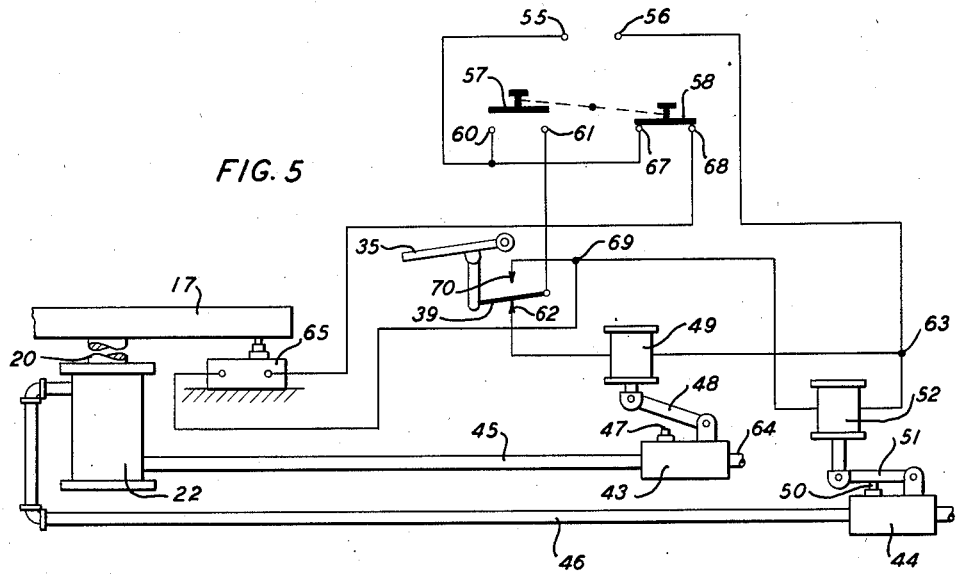
Fig. 5 is a diagram of the control mechanism for the loading platform.

Referring now to the drawings, attention is first directed to Fig. 1 which illustrates the loading platform, indicated generally at 10, having a horizontal lower portion 11 and an upper or vertical portion 12. The lower portion 11 has a vehicle supporting surface 14 which may be described as a lower surface in comparison to the upper surface 15 of the platform. A recess 16 is formed in the portion 11 to receive a lift 17, the upper surface 18 of which is in a plane with the lower surface 14 when the lift is in its normal or lower position. The lift 17 is supported by a ram 20 extending downwardly through an aperture 21 in the portion 11 and into a cylinder 22 which is shown schematically in Fig. 5. The lift 17 is positioned to support the rear end of a vehicle 24, the wheels 25 of which will ride upon the lift when passing over the surface 14 with the lift in its normal position.

A bumper 26 mounted upon rods 27 (only one of which is shown) supports a series of rollers 28 in its outer face to be engaged by the tail end 29 of the vehicle, which in the present embodiment is a truck. The rods 27 are slidably mounted in bushings 30 supported in apertures 31 of the portion 12. Springs 32 supported by the rods 27 serve to cushion the bumper 26 when engaged by a vehicle.

An apron 35 hinged at 36 to the portion 12 is shown in Fig. 1 with its upper surface in a plane with the surface 15 and in substantial alignment with a floor 38 of the truck 24. A double switch 39 is operatively connected to the apron 35 by a lever 40 and a link 41.

The control mechanism illustrated in Fig. 5 includes valves 43 and 44 in fluid lines 45 and 46 respectively leading to the bottom and top of the cylinder 22. The valves 43 and 44 may be of a commercially known type valve functioning to respectively cause raising and lowering of the lift to given positions and maintain the lift in any of the positions until either valve is actuated. The valve 43 has a normally closed plunger 47 operable into open position by a lever 48 when its solenoid 49 is energized. In a similar manner the valve 44 has a plunger 50 which is normally closed and may be operated into open position by a lever 51 when its solenoid 52 is energized.

The control circuit includes supply lines 55 and 56. A start switch 57 is connected to a stop switch 58 whereby the operation of one into closed position will move the other into open position. Actuation of the start switch into closed position when the apron 35 is in the position shown in Fig. 2 will complete a circuit from line 55 through contact 60, switch 57, contact 61, switch 39, its lower contact 62, through the solenoid 49, connection 63 to line 56. Closing of this circuit through the start switch 57 will energize the solenoid 49 to operate the valve 43 through its plunger 47 to open the fluid line 45 to a supply line 64 allowing fluid under pressure to pass into the bottom of the cylinder 22, to raise the lift 17. A microswitch 65, which is normally closed but operated into open position when the lift 17 is in its normal position, functions to open a circuit under the control of the switch 58 when the lift 17 is returned to its normal position. The switch 58 when operated into closed position completes a circuit from line 55 through contact 67, switch 58, contact 68, switch 65, connection 69 through the winding of the solenoid 52 to line 56.

Figures 2, 3:
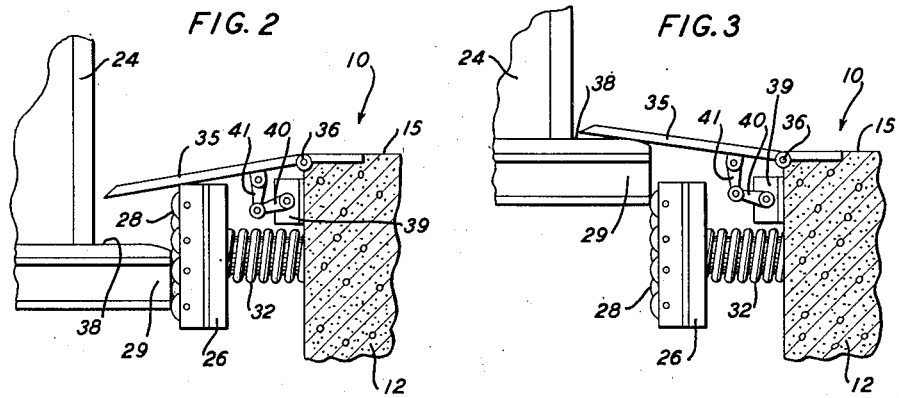
Fig. 2 is a fragmentary detailed view illustrating the position of the vehicle when initially backed on to the lower surface of the loading platform.
Fig. 3 is a fragmentary detailed view of the structure shown in Fig. 2 illustrating the extreme upper position of the floor of the vehicle at which time the upper contacts of the switch controlled by the apron are closed.

Upon considering the function of the loading platform, let it be assumed that a loaded vehicle or truck 24 has been backed on to the surface 14 with the lift 17 in its lower or normal position. When the tail end 29 of the vehicle engages the bumper 26, upon which the apron 35 is resting, the floor 38 of the vehicle is beneath the upper surface 15 of the loading platform (Fig. 2). At this time, the switch 57 is operated into closed position, the switch 39 being in the position shown in Figs. 2 and 5 with the lower contact 62 closed and the upper contact 70 open. After the switch 57 is moved into closed position across its contacts 60 and 61 the circuits through the solenoid 49 will be closed operating the valve 43 to cause fluid under pressure to raise the lift 17, raising also the vehicle 24 which rests upon the lift. As the vehicle moves upwardly, the floor 38 thereof will eventually engage the apron 35 and move the apron about its pivot 36 until the switch 39 is moved free of its lower contact 62. At this time, the circuit through the solenoid 49 is opened and the lift remains in this position until either the lower contact 62 or the upper contact 70 is closed by movement of the apron 35.

The process of unloading the vehicle begins through the aid of hand trucks 72 or the like, removing articles 73 or whatever is contained in the truck therefrom over the apron on to the surface 15 and to any suitable position where the material or articles are to be stored. As the weight on the floor of the truck decreases by removing articles from the vehicle, the springs 75 will tend to resume their normal positions, lifting the body of the vehicle proportionate to the diminishing weight and occasionally causing conditions as illustrated in Fig. 3 where the floor 38 of the vehicle is above the surface 15. When the apron 35 is moved into this position, the upper contact 70 of the switch 39 will be closed completing a circuit from line 55 through contact 60, switch 57, contact 61, contact 70 of switch 39, solenoid 52 to line 56. Energization of the solenoid 52 will operate the valve 44 to allow fluid under pressure to pass to the top of the cylinder 22 moving the lift 17 downwardly until this circuit is opened by movement of the switch 39 free of its contact 70. This operation is automatically repeated. Each time the floor 38 of the vehicle moves upwardly through the force of the springs 75, during unloading of the vehicle, the lift is lowered to maintain the floor of the vehicle in substantial alignment with the surface 15.

Figure 4:
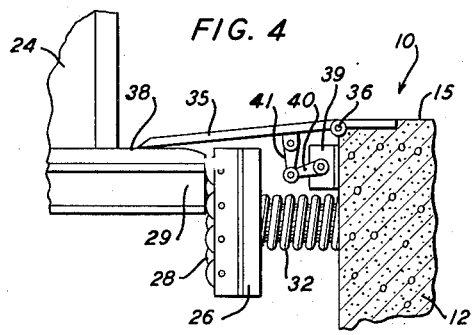
Fig. 4 is a fragmentary detailed view of the structure shown in Fig. 2 illustrating the extreme lower position of the floor of the vehicle during loading or unloading, at which time the lower contacts of the switch controlled by the apron are closed.

A similar operation takes place during loading of a vehicle with articles which are of such weight that they will cause flexing of the springs 75 to move the floor 38 of the vehicle downwardly as the weights of the articles are added thereto. The floor of the vehicle, on such occasions, will be moved below the surface 15 as illustrated in Fig. 4. Through the control mechanism, the floor 38 will be maintained in substantial alignment with the surface 15 automatically. Let it be assumed that the empty vehicle is backed into position, adjacent the bumper 26, raised by the lift 17 until its floor is in substantial alignment with the surface 15, and articles loaded in successive stages in the vehicle causing flexing of the spring 75 by downward movement of the floor 38 as the additional weights of the articles are added to the vehicle. In this instance, the switch 57 remains closed and during each downward movement of the floor 38 to the position shown in Fig. 4, the contact 62 of switch 39 is closed, completing the circuit through the solenoid 49 to operate the valve 43 to raise the lift 17 until the switch 39 is in its neutral or open position. This function of the control unit continues automatically until the vehicle is loaded and ready to be removed from the loading platform. When a vehicle is to be removed from the loading platform, whether it be loaded or empty, the switch 58 is closed, opening the switch 57 completing a circuit through the normally closed switch 65 and the solenoid 52 to open the valve 44 to cause movement of the lift 17 downwardly until it is in its normal position with its surface 18 in a plane with the surface 14 at which time the switch 65 will have been opened to open the previously described circuit completed through the closing of the switch 58.

With this loading platform and its control mechanism, it is apparent that vehicles of various sizes may be backed on to the platform and raised to positions where their floors are substantially in alignment with the upper surface of the platform and automatically maintained in that position whether the vehicle is being loaded or unloaded and regardless of the frequent variations in the loads on the vehicles tending to vary the positions of their floors relative to the upper surface of the platform.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A loading platform for vehicles having article supporting floors, the loading platform comprising portions, one of which has a lower vehicle supporting surface and the other an upper article supporting surface, a lift normally disposed in a recess of the said lower portion with its upper surface substantially in a plane with the vehicle supporting surface to support wheels of a vehicle, means to operate the lift to raise the end of the vehicle supported thereby until the floor of the vehicle is substantially in alignment with the upper surface, an apron movably supported by the upper portion, positioned to rest on the floor of the vehicle and be moved therewith during movement of the floor of the vehicle relative to the upper surface, and means rendered effective by movement of the apron from a neutral position, where the floor of the vehicle is in general alignment with the upper surface, resulting from movement of the floor of the vehicle out of general alignment with the upper surface to operate the lift to move the vehicle until the apron is returned to its neutral position.

2. A loading platform for vehicles having article supporting floors, the loading platform comprising portions, one of which has a lower vehicle supporting surface and the other an upper article supporting surface, a lift normally disposed in a recess of the said lower portion with its upper surface substantially in a plane with the vehicle supporting surface to support wheels of a vehicle, means to operate the lift to raise the end of the vehicle supported thereby until the floor of the vehicle is substantially in alignment with the upper surface, an apron movably supported by the upper portion, positioned to rest on the floor of the vehicle and be moved therewith during movement of the floor of the vehicle relative to the upper surface, and means under the control of the apron to automatically operate the lift to maintain the floor of the vehicle in substantial alignment with the upper surface.

3. A loading platform for vehicles having article supporting floors, the loading platform comprising portions, one of which has a lower vehicle supporting surface and the other an upper article supporting surface, a lift normally disposed adjacent the lower portion to support wheels of a vehicle, an apron movably supported by the upper portion, positioned to rest on the floor of the vehicle and be moved therewith during movement of the floor of the vehicle relative to the upper surface, an operable means to raise the lift, and a unit actuable by the apron during downward movement thereof to render the said means effective when the floor of the vehicle moves a given distance below the said upper surface and to render the said means ineffective when the floor of the vehicle has returned to a position in substantial alignment with the said upper surface.

4. A loading platform for vehicles having article supporting floors, the loading platform comprising portions, one of which has a lower vehicle supporting surface and the other an upper article supporting surface, a lift normally disposed adjacent the lower portion to support wheels of a vehicle, an apron movably supported by the upper portion, positioned to rest on the floor of the vehicle and be moved therewith during movement of the floor of the vehicle relative to the upper surface, an operable means to lower the lift, and a unit actuable by the apron during upward movement thereof to render the said means effective when the floor of the vehicle moves a given distance above the said upper surface and to render the said means ineffective when the floor of the vehicle has returned to a position in substantial alignment with the said upper surface.

5. A loading platform for vehicles having article supporting floors, the loading platform comprising portions, one of which has a lower vehicle supporting surface and the other an upper article supporting surface, a fluid operable lift disposed adjacent the lower portion to support wheels of a vehicle, an apron movably supported by the upper portion, positioned to rest on the floor of the vehicle and be moved therewith during movement of the floor of the vehicle relative to the upper surface, a solenoid operable valve in a fluid line to the lift to cause raising of the lift when energized, and a switch actuated into closed position by the apron during downward movement thereof with the floor of the vehicle out of alignment with the said upper surface to close an electrical circuit to energize the solenoid and operate the valve until the lift raises the floor and apron into general alignment with the said upper surface when the switch will be actuated into open position by the apron to deenergize the solenoid valve.

6. A loading platform for vehicles having article supporting floors, the loading platform comprising portions, one of which has a lower vehicle supporting surface and the other an upper article supporting surface, a fluid operable lift disposed adjacent the lower portion to support wheels of a vehicle, an apron movably supported by the upper portion, positioned to rest on the floor of the vehicle and be moved therewith during movement of the floor of the vehicle relative to the upper surface, a solenoid-operable valve in a fluid line to the lift to cause lowering of the lift when energized, and a switch actuated into closed position by the apron during upward movement thereof with the floor of the vehicle out of alignment with the said upper surface to close an electrical circuit to energize the solenoid and operate the valve until the lift lowers the floor and apron into general alignment with the said upper surface when the switch will be actuated into open position by the apron to deenergize the solenoid valve.

7. A loading platform for vehicles having article supporting floors, the loading platform comprising portions, one of which has a lower vehicle supporting surface and the other an upper article supporting surface, a lift normally disposed in a recess of the said lower portion with its upper surface substantially in a plane with the vehicle supporting surface to support wheels of a vehicle, means to operate the lift to raise the end of the vehicle supported thereby until the floor of the vehicle is substantially in alignment with the upper surface, a bumper supported by the said upper portion to be engaged by the vehicle to locate the said wheels of the vehicle on the lift, an apron movably supported by the upper portion, positioned to rest on the floor of the vehicle and be moved therewith during movement of the floor of the vehicle relative to the upper surface, and means under the control of the apron to automatically operate the lift to maintain the floor of the vehicle in substantial alignment with the upper surface.

8. A loading platform for vehicles having article supporting floors, the loading platform comprising portions, one of which has a lower vehicle supporting surface and the other an upper article supporting surface, a lift normally disposed in a recess of the said lower portion with its upper surface substantially in a plane with the vehicle supporting surface to support wheels of a vehicle, means to operate the lift to raise the end of the vehicle supported thereby until the floor of the vehicle is substantially in alignment with the upper surface, a bumper supported by the said upper portion to be engaged by the vehicle to locate the said wheels of the vehicle on the lift, an apron movably supported by the upper portion, positioned to rest on the floor of the vehicle and be moved therewith during movement of the floor of the vehicle relative to the upper surface, means under the control of the apron to automatically operate the lift to maintain the floor of the vehicle in substantial alignment with the upper surface, and rollers carried by the bumper to facilitate movement of the vehicle relative thereto.

9. A loading platform for vehicles having article supporting floors, the loading platform comprising portions, one of which has a lower vehicle supporting surface and the other an upper article supporting surface, a lift normally disposed adjacent the lower portion to support wheels of a vehicle, an apron movably supported by the upper portion, positioned to rest on the floor of the vehicle and be moved therewith during movement of the floor of the vehicle relative to the upper surface, a first solenoid-operable valve in a fluid line to the lift to cause raising of the lift when energized, a second solenoid-operable valve in a fluid line to the lift to cause lowering of the lift when energized, a switch actuable to close a circuit through the first solenoid-operable valve to raise the lift, and a switch unit, responsive to the movement of the apron, having a lower contact when closed to complete the circuit through the first solenoid-operable valve, an upper contact when closed to complete a circuit through the second solenoid-operable valve and a neutral position between the contacts when the floor of the vehicle and the apron are in general alignment with the said upper surface, whereby movement of the apron by movement of the floor of the vehicle in either direction out of general alignment with the said upper surface will cause closing of one or the other of the contacts to operate its respective solenoid valve to maintain the floor of the vehicle in substantial alignment with the said upper surface.

10. A loading platform for vehicles having article supporting floors, the loading platform comprising portions, one of which has a lower vehicle supporting surface and the other an upper article supporting surface, a lift normally disposed adjacent the lower portion to support wheels of a vehicle, an apron movably supported by the upper portion, positioned to rest on the floor of the vehicle and be moved therewith during movement of the floor of the vehicle relative to the upper surface, a first solenoid operable valve in a fluid line to the lift to cause raising of the lift when energized, a second solenoid-operable valve in a fluid line to the lift to cause lowering of the lift when energized, a switch actuable to close a circuit through the first solenoid-operable valve to raise the lift, a switch unit, responsive to the movement of the apron, having a lower contact when closed to complete the circuit through the first solenoid-operable valve, an upper contact when closed to complete a circuit through the second solenoid-operable valve and a neutral position between the contacts when the floor of the vehicle and the apron are in general alignment with the said upper surface, whereby movement of the apron by movement of the floor of the vehicle in either direction out of general alignment with the said upper surface will cause closing of one or the other of the contacts to operate its respective solenoid valve to maintain the floor of the vehicle in substantial alignment with the said upper surface, an auxiliary switch actuable to close another circuit through the second solenoid operable valve to lower the lift to its normal position, and a normally closed switch in the last mentioned circuit positioned to be actuated by the lift when moved into its normal position to open the said circuit.

JOHN R. DUNN.

No references cited.